(12) United States Patent
Li et al.

(10) Patent No.: US 11,784,309 B2
(45) Date of Patent: Oct. 10, 2023

(54) LITHIUM COBALT METAL OXIDE POWDER, METHOD FOR MAKING THE SAME, AND METHOD FOR DETERMINING CONTENT OF COBALT (II,III) OXIDE

(71) Applicant: BASF SHANSHAN BATTERY MATERIALS CO., LTD., Changsha (CN)

(72) Inventors: Yongchang Li, Changsha (CN); Hong Dong, Changsha (CN); Xuyao Hu, Changsha (CN); Hui Shi, Changsha (CN); Shuang Chen, Changsha (CN); Xiangkang Jiang, Changsha (CN); Xu Li, Changsha (CN); Zhihua Li, Changsha (CN)

(73) Assignee: BASF SHANSHAN BATTERY MATERIALS CO., LTD., Changsha (CN)

( * ) Notice: Subject to any disclaimer, the term of this patent is extended or adjusted under 35 U.S.C. 154(b) by 537 days.

(21) Appl. No.: 16/756,889

(22) PCT Filed: Apr. 26, 2018

(86) PCT No.: PCT/CN2018/084679
§ 371 (c)(1),
(2) Date: Apr. 17, 2020

(87) PCT Pub. No.: WO2019/076023
PCT Pub. Date: Apr. 25, 2019

(65) Prior Publication Data
US 2021/0202939 A1    Jul. 1, 2021

(30) Foreign Application Priority Data

Oct. 20, 2017  (CN) .......................... 201710983605.0
Oct. 20, 2017  (CN) .......................... 201710984022.X

(51) Int. Cl.
*H01M 4/525*  (2010.01)
*C01G 51/00*  (2006.01)
(Continued)

(52) U.S. Cl.
CPC ............ *H01M 4/525* (2013.01); *C01G 51/42* (2013.01); *G01N 27/30* (2013.01); *H01M 4/04* (2013.01); *H01M 10/0525* (2013.01)

(58) Field of Classification Search
CPC ...... H01M 4/523; H01M 4/525; H01M 4/366; C01G 51/50
See application file for complete search history.

(56) References Cited

U.S. PATENT DOCUMENTS 9,979,014 B2    5/2018  Kim et al.
2004/0258836 A1  12/2004  Besenhard et al.
(Continued)

FOREIGN PATENT DOCUMENTS

CN    101029876 A    9/2007
CN    101105458 A    1/2008
(Continued)

OTHER PUBLICATIONS

Korean Office Action, and Machine Translation thereof, for corresponding Korean counterpart Application No. 10-2020-7011291, dated Nov. 23, 2021 (17 pages).
(Continued)

*Primary Examiner* — Nathanael T Zemui
(74) *Attorney, Agent, or Firm* — Kagan Binder, PLLC

(57) ABSTRACT

A lithium cobalt metal oxide powder is disclosed in the present disclosure. The lithium cobalt metal oxide powder has a coating structure. The lithium cobalt metal oxide powder includes a lithium cobalt metal oxide matrix. The lithium cobalt metal oxide powder further includes a $Co_3O_4$ coating layer. A general formula of the lithium cobalt metal (Continued)

oxide powder is $Li_aCo_{1-x-y}M_xN_yO_2 \cdot rCo_3O_4$, wherein $0.002 < r \leq 0.05$, $1 \leq a \leq 1.1$, $0 < x \leq 0.02$, $0 \leq y \leq 0.005$, and $a < 1+3r$; M is a doping element; and N is a coating element. A method for making the lithium cobalt metal oxide powder as described above and a method for determining a content of $Co_3O_4$ therein are further provided. The material made in the present disclosure has an excellent electrochemical performance.

18 Claims, 2 Drawing Sheets

(51) Int. Cl.
  *G01N 27/30* (2006.01)
  *H01M 4/04* (2006.01)
  *H01M 10/0525* (2010.01)

(56) References Cited

U.S. PATENT DOCUMENTS

| | | | |
|---|---|---|---|
| 2007/0099086 | A1 | 5/2007 | Kang et al. |
| 2008/0131782 | A1 | 6/2008 | Hagiwara et al. |
| 2009/0117464 | A1 | 5/2009 | Cho et al. |
| 2015/0380722 | A1* | 12/2015 | Blangero ............ H01M 4/525 252/182.1 |
| 2017/0301909 | A1* | 10/2017 | Lee ................. H01M 4/505 |
| 2017/0309910 | A1* | 10/2017 | Jo .................. H01M 4/525 |
| 2018/0026267 | A1 | 1/2018 | Kim et al. |
| 2021/0202939 | A1 | 7/2021 | Li et al. |

FOREIGN PATENT DOCUMENTS

| | | |
|---|---|---|
| CN | 101510606 A | 8/2009 |
| CN | 101685067 A | 3/2010 |
| CN | 102607988 A | 7/2012 |
| CN | 103515606 A | 1/2014 |
| CN | 103606671 A | 2/2014 |
| CN | 104201367 A | 12/2014 |
| CN | 104979546 A | 10/2015 |
| CN | 105680009 A | 6/2016 |
| CN | 106006762 A | 10/2016 |
| CN | 106356509 A | 1/2017 |
| CN | 106532006 A | 3/2017 |
| CN | 106745331 A | 5/2017 |
| CN | 106892464 A | 6/2017 |
| CN | 106898751 A | 6/2017 |
| CN | 107565125 A | 1/2018 |
| EP | 3272711 A1 | 1/2018 |
| JP | 2010160113 A | 7/2010 |
| JP | 2011049120 A | 3/2011 |
| JP | 2015201432 A | 11/2015 |
| JP | 2016138024 A | 8/2016 |
| KR | 20150065046 A | 6/2015 |
| KR | 20150070853 A | 6/2015 |
| KR | 101593401 B1 | 2/2016 |

OTHER PUBLICATIONS

Chinese Search Report for Corresponding Chinese Application No. 201710983605.0, dated Oct. 20, 2017 (1 page).
Chinese Office Action for Corresponding Chinese Application No. 201710984022.X, dated Jul. 10, 2020 (5 pages).
European Office Action for Corresponding European Application No. 18869182.8, dated Jun. 22, 2021 (11 pages).
Japanese Office Action for Corresponding Japanese Application No. 2020-521456, dated Jun. 7, 2021 (4 pages).
Xiaotong et al., "Study on the recovery of cobalt in lithium-ion batteries of waste mobile phones by sulfuric acid method," Journal of Green Science and Technology, Issue 14, pp. 164-165, 2016, (2 pages).
Cho et al., "Complete blocking of Mn3+ ion dissolution from a LiMn2O4 spinel intercalation compound by Co3O4 coating," Chemical Communications, Issue 12, pp. 1074-1075, 2001, (3 pages).
International Search Report, and English Translation thereof, for International Application No. PCT/CN2018/084678, dated Jul. 19, 2018 (5 pages).
Extended European Search Report for European Application No. 18847728.5, dated May 27, 2021 (8 pages).
International Search Report, and English Translation thereof, for International Application No. PCT/CN2018/084679, dated Aug. 6, 2018 (4 pages).
Unpublished Utility U.S. Appl. No. 16/638,630, filed Feb. 12, 2020.

* cited by examiner

LITHIUM COBALT METAL OXIDE POWDER, METHOD FOR MAKING THE SAME, AND METHOD FOR DETERMINING CONTENT OF COBALT (II,III) OXIDE

TECHNICAL FIELD

The present disclosure belongs to the field of lithium ion battery material, and in particular relates to a metal oxide powder for a cathode material, a method for making the same, and a method for determining a content of $Co_3O_4$.

BACKGROUND

A lithium ion battery, having advantages such as low weight, high specific energy, no memory effect, environmental friendliness, low self-discharge, long cycle life, etc., has been widely used in various civilian and military fields, such as mobile phones, laptops, video cameras, digital cameras, and so on, and possesses a bright application prospect in electric vehicles, spaceflights, and energy storage.

In recent years, the performances of mobile devices and communication devices are constantly improved with the continuous development of science and technology, which set higher demands on energy density, cycle life, high temperature performance, etc. of the lithium ion battery. Since improvements of those performances are directly related to the performance of the cathode material of the lithium ion battery, developing a cathode material with a higher energy density, a good cycle performance, and an excellent high temperature performance to meet people's demands has been a hot spot in the development of the lithium ion battery. It is known that the energy density of the lithium ion battery=discharge capacity×discharge voltage platform×press density. When the press density of the material is constant, the discharge capacity and the discharge voltage platform will increase with an increase of a cut-off discharge voltage of the cathode material, thereby increasing the energy density of the lithium ion battery. Currently, the production technology of lithium cobalt oxide has been relatively mature, but still has some shortcomings. When cycling within a charge and discharge voltage range of 3.0-4.2V (vs. Li), the lithium cobalt oxide material actually has a stable performance, but only half of lithium ions thereof are intercalated and de-intercalated in the charge and discharge processes, resulting in a low discharge capacity. If the cut-off voltage is increased (especially to above 4.3 V), the discharge capacity will be increased as well, but the structure of $LiCoO_2$ will be unstable, thereby causing a series of issues, such as poor charge and discharge cycling performance at high voltages and poor storage performance at high temperatures. Especially when the battery is at a high temperature or is charged and discharged repeatedly, a surface of the cathode material of the lithium ion battery will react slowly with the electrolyte solution, thereby gradually reducing the performance of the material.

The press density of the material can be increased mainly by increasing the granularity and the crystallinity of the material. Li can be used as a fluxing agent to increase the crystallinity of particles thereby enlarging the particles in the sintering, so as to increase the press density of the material. However, the material will contain a large amount of residual Li, which easily induces a gas inflation at high temperature, and endangers the safety performance. By coating with a Co micro powder material and sintering at a high temperature, excess Li can be adsorbed, which is favorable to improve the high temperature safety performance of the material. However, at a high voltage, with the increase of de-intercalation amount of Li ions, $Co^{3+}$ can be oxidized into $Co^{4+}$ and then have a side reaction with the electrolyte, thereby attenuating the cycle performance.

Co is frequently added as a modifying substance into the cathode material of the lithium ion battery, and $Co_3O_4$ may be remained in the cathode material. However, it is known that $Co_3O_4$ has no activity in the charge and discharge processes. Therefore, the high concentration $Co_3O_4$ remained on the surface of the cathode material will affect the charge and discharge capacities, more specifically, will reduce the charge and discharge capacities. Thus, it is very important to control the amount of Co remained on the surface of the cathode material for improving the performance of the lithium cobalt oxide. However, there is no good method for determining the residual Co in the cathode material in the prior art.

SUMMARY

The technical problem to be solved by the present disclosure is to provide a lithium cobalt metal oxide powder having a high energy density, less side reactions between a cathode material and an electrolyte, and a good cycle performance, a method for making the same, and a method for determining a content of $Co_3O_4$ to overcome the shortcomings and defects as described in the above background. To solve the above technical problem, the present disclosure provides technical solutions as follows.

A lithium cobalt metal oxide powder is provided. The lithium cobalt metal oxide powder has a coating structure. The lithium cobalt metal oxide powder includes a lithium cobalt metal oxide matrix. The lithium cobalt metal oxide powder further includes a $Co_3O_4$ coating layer. A general formula of the lithium cobalt metal oxide powder is $Li_aCo_{1-x-y}M_xN_yO_2 \cdot rCo_3O_4$, wherein $0.002 < r \leq 0.05$, $1 \leq a \leq 1.1$, $0 < x \leq 0.02$, $0 \leq y \leq 0.005$, and $a < 1 + 3r$; M is a doping element; and N is a coating element. In the above formula, if $1 + 3r \leq a$, the cycle performance of the lithium cobalt metal oxide powder would not be guaranteed. The Co ions are excessive in the lithium cobalt metal oxide powder as described above, and the excess Co ions are in the form of $Co_3O_4$. The content of the $Co_3O_4$ can be obtained by a quantitative detection and analysis.

In an embodiment, a molar ratio $\theta_1$ of Li to Co+M+N in the lithium cobalt metal oxide powder satisfies: $0.92 \leq \theta_1 < 1$.

In an embodiment, the excess $Co_3O_4$ is presented both in an interior and on an outer surface of the lithium cobalt metal oxide matrix. A mass ratio of the $Co_3O_4$ in the interior of the lithium cobalt metal oxide matrix to the $Co_3O_4$ on the outer surface of the lithium cobalt metal oxide matrix is smaller than 1.

In an embodiment, M is one or more of Mg, Ca, Cu, Al, B, Ti, Y, and Zr; and N is one or more of Na, K, Mg, Ca, Cu, Al, B, Ti, Y, Zr, Ni, and Mn. For example, M is one or two of Mg and Al; and N is one or two of Mg and Ti.

In an embodiment, the $Co_3O_4$ is in a form of spinel phase $Co_3O_4$. An amount of residual Li on the outer surface of the lithium cobalt metal oxide matrix is smaller than or equal to 0.05%.

As a single general inventive concept, a method for making the above-described lithium cobalt metal oxide powder is further provided in the present disclosure. The method includes steps of:

(1) mixing uniformly and then sintering a Li-containing precursor, a first Co-containing precursor, and a M-containing precursor to obtain a lithium-rich matrix;

(2) if the lithium cobalt metal oxide powder includes the coating element N, mixing uniformly and then sintering the lithium-rich matrix obtained from the step (1), a second Co-containing precursor, and a N-containing precursor to obtain the lithium cobalt metal oxide powder; if the lithium cobalt metal oxide powder includes no coating element N, mixing uniformly and then sintering the lithium-rich matrix obtained from the step (1) and a second Co-containing precursor to obtain the lithium cobalt metal oxide powder.

In an embodiment, in the step (1), a molar ratio $\theta_2$ of Li to Co+M satisfies: $1.0<\theta_2<1.08$, for example, $\theta_2$ satisfies: $1.04<\theta_2<1.08$. Li can be used as a fluxing agent to increase the crystallinity of particles thereby enlarging the particles in the sintering, so as to increase the press density of the material. By having excess Li in the sintering process, the sintered material can have excellent processability and press density. In an embodiment, a molar ratio $\theta_1$ of Li to Co+M+N satisfies: $0.92 \leq \theta_1 < 1.0$, for example, the molar ratio $\theta_1$ of Li to a sum of Co, M, and N satisfies: $0.95 \leq \theta_1 < 1.0$, with such ratios, a balance between the capacity and the cycle performance can be achieved in the sintered material.

In an embodiment, in the step (2), the second Co-containing precursor is one or more of $Co(OH)_2$, $CoCO_3$, and $Co_3O_4$. The second Co-containing precursor includes secondary particles, and each secondary particle is composed of primary particles. The secondary particles have a D50≤7 μm, for example, have a D50≤5 μm. The primary particles have a D50<1.0 μm.

In an embodiment, in the step (1), a sintering temperature is 900° C. to 1100° C., a sintering time is 8 h to 12 h, and the sintering is performed in an air atmosphere. In the step (2), a sintering temperature is 600° C. to 1000° C., a sintering time is 6 h to 12 h, and the sintering is performed in an air atmosphere.

In the method, M added in the step (1) mainly has a doping effect, and N added in the step (2) mainly has a coating effect. Slightly excess Co added in the step (2) can react with the excess Li from the step (1) during the sintering to produce a hexagonal phase lithium cobalt metal oxide, which is favorable to improve the discharge specific capacity and the cycle performance of the material, and can reduce the amount of the residual Li on the surface and improve the high temperature performance and safety performance of the material. Excess Co is remained in the interior and/or on the surface of the lithium cobalt metal oxide powder after the sintering is finished. The excess Co is in the form of spinel phase $Co_3O_4$. At a high voltage, on one hand, the excess $Co_3O_4$ can prevent the contact of $LiCoO_2$ with the electrolyte solution, thereby preventing the slow reaction, which can deteriorate the performance of the cathode material, between the surface of the cathode material $LiCoO_2$ and the electrolyte solution; on the other hand, compared to $Co^{3+}$, $Co^{2+}$ in the $Co_3O_4$ is more difficult to be oxidized into $Co^{4+}$, such that the concentration of $Co^{4+}$ on the surface of the cathode material is reduced, thereby reducing the side reaction between the $Co^{4+}$ and the electrolyte solution at a relatively high cut-off voltage. As such, the cycle performance of the material can be improved while maintaining the high energy density and the high temperature safety performance of the material.

As a single general inventive concept, a method for determining a content of $Co_3O_4$ in the above-described lithium cobalt metal oxide powder is further provided accordingly. The method includes the steps of:

(1) adding a soaking agent and a metal ion salt solution to a sample to be tested, stirring and dissolving fully to obtain a first solution;

(2) filtering the first solution obtained from the step (1) by a filter membrane, and washing a residue on the filter membrane after the filtration is finished;

(3) adding the filter membrane along with the residue of the step (2) into a strong acid solution, peeling off the residue totally from the filter membrane into the strong acid solution, thereby obtaining a second solution containing the residue and the strong acid solution;

(4) adding a strong acid solution again into the second solution obtained from the step (3) to obtain a mixed solution, heating, evaporating, and drying the mixed solution;

(5) cooling and then diluting to a final volume, thereby obtaining a solution to be measured;

(6) measuring a content of Co in the solution obtained from the step (5), and then calculating a corresponding content of $Co_3O_4$ to obtain the content of the $Co_3O_4$ in the sample.

In an embodiment, the step (4) is repeated at least once before proceeding the step (5) to increase the data accuracy.

In an embodiment, the soaking agent is one or more of HCl, $H_2SO_4$, and $H_3PO_4$ and includes at least one or two of $H_2SO_4$, and $H_3PO_4$. The metal ion salt solution includes one or more of $NiSO_4$, $NiCl_2$, $MnSO_4$, $MnCl_2$, $FeSO_4$, $FeCl_2$, $Cu_2SO_4$, $CuCl_2$, $CrSO_4$, and $CrCl_2$. The soaking agent and the metal ion salt solution (mainly to have the reduction and replacement function) are added to the sample to dissolve and then remove Co contained in the $LiCoO_2$ in the sample, so that a residue consists of $Co_3O_4$ can be obtained after the filtration.

In an embodiment, the strong acid is one or more of nitric acid, hydrochloric acid, and aqua regia. Mass concentrations of the nitric acid, the hydrochloric acid, and the aqua regia are 30% to 70%.

In an embodiment, in the step (1), a stirring time is 0.5 h to 2 h. The stirring time should be reasonably controlled since it affects the test result to some extent.

In an embodiment, the stirring time is 0.8 h to 1.4 h.

In the method, the soaking agent and the metal ion salt solution (mainly to have reducing and replacement function) are firstly added into the sample in the step (1) to dissolve and then remove Co contained in the $LiCoO_2$ in the sample, so that a residue consists of $Co_3O_4$ can be obtained after the filtration. The acid solution is added again in the step (3) and the step (4) so as to dissolve $Co_3O_4$ to obtain a Co-containing solution. After removing the acid solution by evaporating and then diluting to the final volume, the content of Co is measured and converted to the corresponding content of $Co_3O_4$ to obtain the content of $Co_3O_4$ in the sample.

Taking $FeSO_4$ as an example, the reaction occurs in the step (1) is as following:

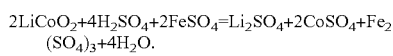
$$2LiCoO_2 + 4H_2SO_4 + 2FeSO_4 = Li_2SO_4 + 2CoSO_4 + Fe_2(SO_4)_3 + 4H_2O.$$

The present disclose has the following advantages as compared to the prior art:

1. Excess Co is remained in the lithium cobalt metal oxide of the present disclose in the form $Co_3O_4$. At a high voltage, on one hand, the excess $Co_3O_4$ can prevent the contact of $LiCoO_2$ with the electrolyte solution, thereby preventing the slow reaction, which can deteriorate the performance of the cathode material, between the surface of the cathode material LiCoO$_2$ and the electrolyte solution; on the other hand, the concentration of Co$^{4+}$ at the high voltage can be reduced, thereby reducing the side reaction between the Co$^{4+}$ and the electrolyte solution at a relatively high cut-off voltage and thus improving the cycle performance of the material.

2. Excess Co are added in the preparation process of the present disclosure to consume the excess lithium carbonate or lithium hydroxide in the material during the sintering, thereby improving the high temperature performance and the safety performance of the material.

3. The determining method of the present disclosure is simple. The raw materials used in the measurement are easy to be obtained. The content of Co$_3$O$_4$ remained in the cathode active material of the lithium ion battery can be accurately determined by the determining method of the present disclosure, so that the amount of residual Co$_3$O$_4$ can be accurately controlled, which provides a theoretical guidance to achieve a balance between the cycle performance and the capacity performance of the cathode active material of the lithium ion battery.

BRIEF DESCRIPTION OF THE DRAWINGS

The drawings to be used in the description of the embodiments or the prior art are described briefly as follows, to more clearly describe the technical solutions according to the embodiments of the present disclosure or according to the prior art. It is apparent that the drawings in the following description are only some embodiments of the present disclosure. Other drawings may be obtained by one of ordinary skill in the art according to these drawings without any creative work.

DETAILED DESCRIPTION

Figure 1:
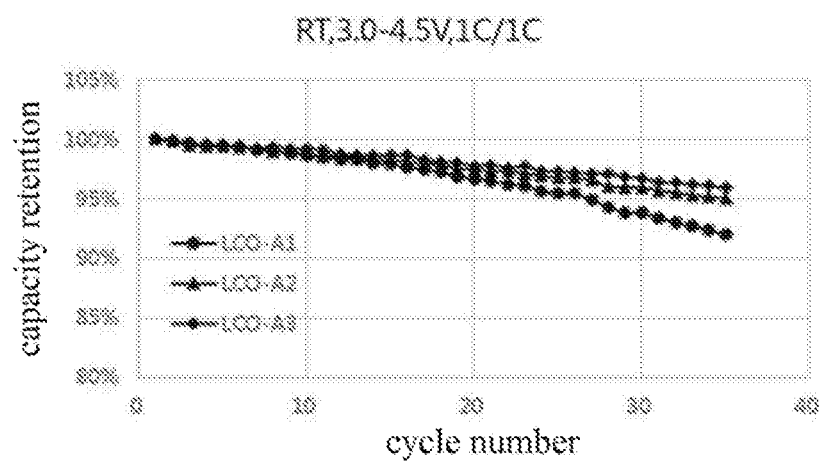
FIG. 1 shows cycle performance curves of button cell tests of samples made in Examples 1 to 3.

For a clear understanding of the present disclosure, the present disclosure will now be described more comprehensively and in detail with reference to the accompanying drawings and preferred embodiments. However, the scope of the present disclosure is not limited to the following specific embodiments.

Unless otherwise defined, all terms used hereinafter have the same meaning as commonly understood by one of ordinary skill in the art. The terms used herein are merely for illustrating the specific embodiments, and are not intended to limit the scope of the present disclosure.

Unless otherwise specified, various raw materials, agents, instruments, equipment and the like used in the present disclosure can all be commercially available or can be obtained by means of existing methods.

Example 1

The method for making the lithium cobalt metal oxide powder includes the steps as follows:
(1) The raw materials are weighed in accordance with a formula Li$_{1.06}$Co$_{0.99}$Mg$_{0.01}$O$_2$, mixed uniformly, then placed into an elevator furnace which is accessible to air, and then sintered. The Li-containing precursor is lithium carbonate. The Co-containing precursor is Co$_3$O$_4$ having a D50 of 15 μm. The Mg-containing precursor is an oxide corresponding thereto. The sintering temperature is 1030° C. The sintering time is 10 h. The whole sintering is in the air atmosphere. The sintered lithium cobalt oxide is sieved, pulverized, and so on. A lithium cobalt oxide LCO-A is obtained.

(2) LCO-A is mixed with different amounts of Co(OH)$_2$ uniformly in accordance with a formula LiCo$_{0.99}$Mg$_{0.01}$O$_2$·rCo$_3$O$_4$. Then the mixture is placed into the elevator furnace which is accessible to air, and then sintered to obtain the lithium cobalt metal oxide powder. Wherein, the sintering temperature is 900° C. The sintering time is 10 h. The Co(OH)$_2$ has a D50 of 0.8 μm.

A method for determining the content of Co$_3$O$_4$ in the above-described lithium cobalt metal oxide powder is further provided in this example, including the steps of:

(1) adding NiSO$_4$ and H$_2$SO$_4$ solutions into the lithium cobalt metal oxide powder, and magnetically stirring and dissolving for 1.5 h, thereby obtaining a first solution;

(2) filtering the first solution obtained from the step (1) by suction filtration, and maintaining the filtration state after the filtration is finished while washing the residue on the filtration membrane with pure water;

(3) adding the filtration membrane along with the residue of the step (2) into a nitric acid solution with a mass concentration of 30%, peeling off the residue from the filtration membrane by a ultrasonic treatment, then removing the filtration membrane by tweezers, and washing the trace residue attached on the filtration membrane into the nitric acid solution by using the deionized water, thereby obtaining a second solution containing the residue and the nitric acid;

(4) adding a nitric acid solution again into the second solution obtained from the step (3) to obtain a mixed solution, and heating to have the solution evaporated and dried;

(5) cooling, repeating the step (4) once again, cooling once again, and then diluting to a final volume, thereby obtaining a solution to be measured;

(6) measuring the content of Co in the solution obtained from the step (5) (a measuring method can be selected from the atomic absorption spectrometry and other frequently-used methods), and then calculating the content of Co$_3$O$_4$ to obtain the content of Co$_3$O$_4$ in LiCo$_{0.99}$Mg$_{0.01}$O$_2$·rCo$_3$O$_4$.

In this example, the calculated content of Co$_3$O$_4$ is 1088 ppm, and the calculated r=0.0005. That is, the chemical formula is LiCo$_{0.99}$Mg$_{0.01}$O$_2$·0.0005Co$_3$O$_4$. A sample of the lithium cobalt metal oxide powder in this example is labeled as LCO-A1.

Example 2

The only difference between the making method in the example 2 and that in the example 1 is in the amount of Co(OH)$_2$ added in the step (2) during the making. The method for determining the content of Co$_3$O$_4$ in this example is the same as that in the example 1.

In this example, the calculated content of Co$_3$O$_4$ is 5626 ppm, and the calculated r=0.0055. That is, the chemical formula is LiCo$_{0.99}$Mg$_{0.01}$O$_2$·0.0055Co$_3$O$_4$. A sample of the lithium cobalt metal oxide powder in this example is labeled as LCO-A2.

Example 3

The only difference between the making method in the example 3 and that in the example 1 is in the amount of $Co(OH)_2$ added in the step (2) during the making. The method for determining the content of $Co_3O_4$ in this example is the same as that in the example 1.

In this example, the calculated content of $Co_3O_4$ is 10102 ppm, and the calculated r=0.004. That is, the chemical formula is $LiCo_{0.99}Mg_{0.01}O_2 \cdot 0.004Co_3O_4$. A sample of the lithium cobalt metal oxide powder in this example is labeled as LCO-A3.

Figure 2:
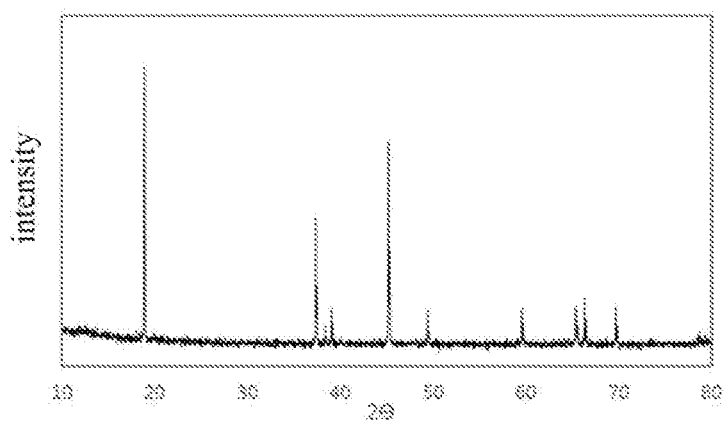
FIG. 2 is a XRD spectrum of the sample made in the Example 1.

The samples obtained in the examples 1-3 are subjected to a button cell capacity test. As shown in Table 1, when charging and discharging at a rate of 0.1 C in a voltage range of 3.0 V to 4.5V, there is only a slight difference between the capacities of the LCO-A1 and the LCO-A2, while the capacity of the LCO-A3 is decreased for 2 mAh/g as compared to that of the LCO-A1. Taking the content value of $Co_3O_4$ into account, the residual $Co_3O_4$ in the LCO-A3 is 10102 ppm and has no electrochemical activity in the charge and discharge processes, thus the capacity is decreased. As shown in FIG. 1, when charging and discharging at a rate of 1 C, a capacity retention during cycling is gradually increased with the increase of the content of the residual $Co_3O_4$. The reason is that at a relatively high cut-off voltage, the $Co_3O_4$ having no activity on the surface prevents the side reaction between $Co^{4+}$ and the electrolyte solution, thereby increasing the cycle performance of the material. FIG. 2 is a XRD spectrum of the sample LCO-A1 obtained from the example 1, from which it can be seen that the crystal obtained from the example 1 is pure layered lithium cobalt oxide, suggesting that the excess Li in the firstly sintered matrix is absorbed by the excess Co added in the second sintering, thereby producing $LiCoO_2$. On one hand, the specific discharge capacity of the material can be increased under a not relatively high content of residual $Co_3O_4$. On the other hand, absorbing the excess Li in the matrix by using Co is favorable to reduce the inflation at high temperature and improve the safety performance and the high temperature performance of the material.

TABLE 1

Charge and discharge specific capacities and efficiencies of the samples made in the examples 1-3

| 3.0-4.5 V, 25° C. | | LCO-A1 | LCO-A2 | LCO-A3 |
|---|---|---|---|---|
| Charge | $mAhg^{-1}$ | 202.0 | 201.2 | 199.1 |
| Discharge | $mAhg^{-1}$ | 195.3 | 195.1 | 193.3 |
| Efficiency | % | 96.7 | 97.0 | 97.1 |

Example 4

The method for making the lithium cobalt metal oxide powder includes the steps as follows (1) The raw materials are weighed in accordance with a formula of $Li_{1.04}Co_{0.98}Al_{0.02}O_2$, mixed uniformly, then placed into an elevator furnace which is accessible to air, and then sintered. The Li-containing precursor is lithium carbonate. The Co-containing precursor is $Co_3O_4$ having a D50 of 15 μm. The Al-containing precursor is $Al_2O_3$. The sintering temperature is 1050° C. The sintering time is 10 h. The whole sintering is in the air atmosphere. The sintered lithium cobalt oxide is processed by sieved, pulverized, and so on to obtain a lithium cobalt oxide LCO-B.

(2) LCO-B is mixed with different amounts of $Co_3O_4$ in accordance with a formula of $LiCo_{0.98-x}Al_{0.02}Mg_xO_2 \cdot rCo_3O_4$. MgO having a molar ratio of 0.5% is added to the mixture. The mixture is mixed uniformly, then placed into the elevator furnace which is accessible to air, and then sintered to obtain the lithium cobalt metal oxide powder. The sintering temperature is 900° C. The sintering time is 10 h. The $Co_3O_4$ includes secondary particles with a D50 of 3 μm. Primary particles have a D50 smaller than 1 μm.

A method for determining the content of $Co_3O_4$ in the above-described lithium cobalt metal oxide powder is further provided in this example, including the steps of:

(1) adding $MnSO_4$, $H_3PO_4$ and HCl solutions into the lithium cobalt metal oxide powder, and magnetically stirring and dissolving for 1.0 h, thereby obtaining a first solution;

(2) filtering the first solution obtained from the step (1) by suction filtration, and maintaining the filtration membrane at the filtration state after the filtration is finished while washing the residue on the filtration membrane with pure water;

(3) adding the filtration membrane along with the residue of the step (2) into a nitric acid solution with a mass concentration of 70%, peeling off the residue from the filtration membrane by a ultrasonic treatment, then removing the filtration membrane by tweezers, washing the trace residue attached on the filtration membrane into the nitric acid solution by using the deionized water, thereby obtaining a second solution containing the residue and the nitric acid;

(4) adding a nitric acid solution again into the second solution obtained from the step (3) to obtain a mixed solution, and heating to have the solution evaporated and dried;

(5) cooling, then repeating the step (4) once again, cooling once again, and then diluting to a final volume, thereby obtaining a solution to be measured;

(6) measuring the content of Co in the solution obtained from the step (5) (a measuring method can be selected from the atomic absorption spectrometry and other frequently-used methods), and then calculating the content of $Co_3O_4$ to obtain the content of $Co_3O_4$ in the lithium cobalt metal oxide powder.

In this example, the calculated content of $Co_3O_4$ is 10105 ppm, and the calculated r=0.005. That is, the chemical formula is $LiCo_{0.975}Al_{0.02}Mg_{0.005}O_2 \cdot 0.005Co_3O_4$. A sample of the lithium cobalt metal oxide powder in this example is labeled as LCO-B1.

Example 5

The only difference between the making method in the example 5 and that in the example 4 is in the amount of $Co_3O_4$ added in the step (2) during the making. The method for determining the content of $Co_3O_4$ in this example is the same as that in the example 4.

In this example, the calculated content of $Co_3O_4$ is 21000 ppm, and the calculated r=0.0105. That is, the chemical formula is $LiCo_{0.975}Al_{0.02}Mg_{0.005}O_2 \cdot 0.0105Co_3O_4$. A sample of the lithium cobalt metal oxide powder in this example is labeled as LCO-B2.

Example 6

The difference between the making method in the example 6 and that in the example 4 is that, in this example, during the making, the amount of $Co_3O_4$ added in the step (2) is varied, and $TiO_2$ with a mol ratio of 0.5%, instead of MgO, is added in the step (2).

A method for determining the content of $Co_3O_4$ in the lithium cobalt metal oxide powder is further provided in this example, including the steps of:

(1) adding $FeSO_4$, $H_2SO_4$ and $H_3PO_4$ solutions into the lithium cobalt metal oxide powder, and magnetically stirring and dissolving for 0.8 h, thereby obtaining a first solution;

(2) filtering the first solution obtained from the step (1) by suction filtration, and maintaining the filtration membrane at the filtration state after the filtration is finished while washing the residue on the filtration membrane with pure water;

(3) adding the filtration membrane along with the residue of the step (2) into an aqua regia solution, peeling off the residue from the filtration membrane by a ultrasonic treatment, then removing the filtration membrane by tweezers, washing the trace residue attached on the filtration membrane into the aqua regia solution, thereby obtaining a second solution containing the residue and the aqua regia;

(4) adding a aqua regia solution again into the second solution obtained from the step (3) to obtain a mixed solution, and heating to have the solution evaporated and dried;

(5) cooling, then repeating the step (4) once again, cooling once again, and then diluting to a final volume, thereby obtaining a solution to be measured;

(6) measuring the content of Co in the solution obtained from the step (5) (a measuring method can be selected from the atomic absorption spectrometry and other frequently-used methods), and then calculating the content of $Co_3O_4$ to obtain the content of $Co_3O_4$ in the lithium cobalt metal oxide powder.

In this example, the calculated content of $Co_3O_4$ is 19917 ppm, and the calculated r=0.01. That is, the chemical formula is $LiCo_{0.975}Al_{0.02}Ti_{0.005}O_2 \cdot 0.01Co_3O_4$. A sample of the lithium cobalt metal oxide powder in this example is labeled as LCO-B3.

Example 7

The difference between the making method in the example 7 and that in the example 4 is that, in this example, during the making, the amount of $Co_3O_4$ added in the step (2) is varied, and $TiO_2$ with a mol ratio of 0.5% is further added in the step (2).

A method for determining the content of $Co_3O_4$ in the lithium cobalt metal oxide powder is further provided in this example, including the steps of:

(1) adding $CrCl_2$ and $CuCl_2$ solutions, HCl and $H_2SO_4$ into the lithium cobalt metal oxide powder, and magnetically stirring and dissolving for 1.2 h, thereby obtaining a first solution;

(2) filtering the first solution obtained from the step (1) by suction filtration, and maintaining the filtration membrane at the filtration state after the filtration is finished while washing the residue on the filtration membrane with pure water;

(3) adding the filtration membrane along with the residue of the step (2) into a nitric acid solution with a mass concentration of 50%, peeling off the residue from the filtration membrane by a ultrasonic treatment, then removing the filtration membrane by tweezers, washing the trace residue attached on the filtration membrane into the aqua regia solution, thereby obtaining a second solution containing the residue and the aqua regia;

(4) adding a nitric acid solution again into the second solution obtained from the step (3) to obtain a mixed solution, and heating to have the solution evaporated and dried;

(5) cooling, then repeating the step (4) once again, cooling once again, and then diluting to a final volume, thereby obtaining a solution to be measured;

(6) measuring the content of Co in the solution obtained from the step (5) (a measuring method can be selected from the atomic absorption spectrometry and other frequently-used methods), and then calculating the content of $Co_3O_4$ to obtain the content of $Co_3O_4$ in the lithium cobalt metal oxide powder.

In this example, the calculated content of $Co_3O_4$ is 20130 ppm, and the calculated r=0.01. That is, the chemical formula is $LiCo_{0.97}Al_{0.02}Mg_{0.005}Ti_{0.005}O_2 \cdot 0.01Co_3O_4$. A sample of the lithium cobalt metal oxide powder in this example is labeled as LCO-B4.

Figure 3:
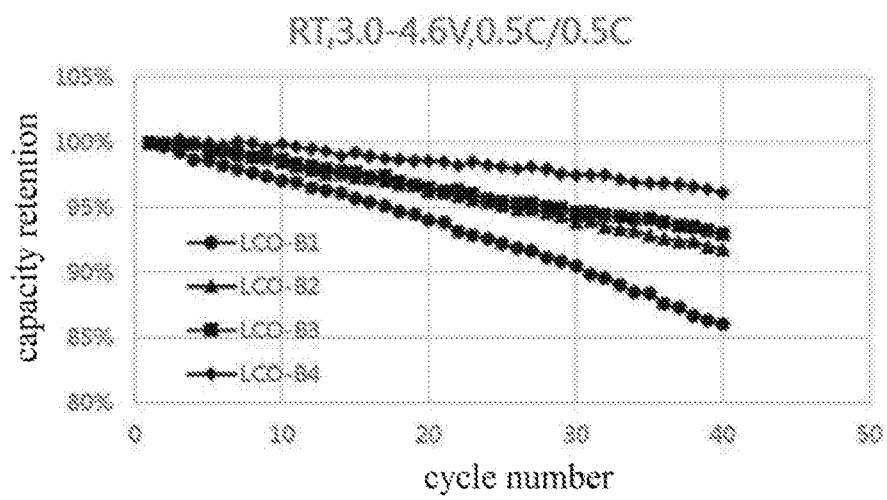
FIG. 3 shows cycle performance curves of button cell tests of samples made in Examples 4 to 7.
Figure 4:
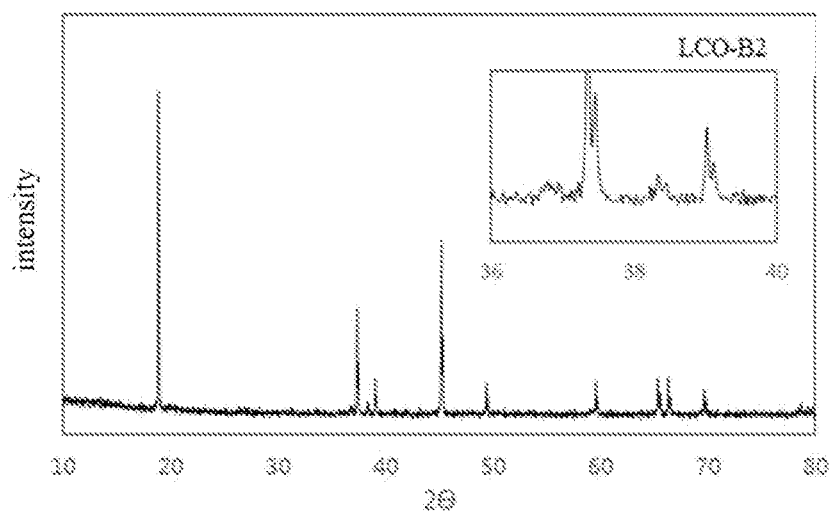
FIG. 4 is a XRD spectrum of the sample made in the Example 5.

The samples obtained in the examples 4-7 are subjected to a button cell capacity test. As shown in FIG. 3, it can be known by analyzing the LCO-B1 and the LCO-B2 that within a voltage range of 3.0 V to 4.6 V, at charge and discharge rates of 0.5 C, the capacity retention during the cycling is gradually increased with the increase of the content of residual $Co_3O_4$. It can be known by analyzing the LCO-B2, the LCO-B3, and the LCO-B4 that the Mg and Ni composite coating can provide the most prominent improvements on the cycle performance. FIG. 4 is the XRD spectrum of the sample obtained in the Example 5, from which it can be seen that a sharp diffraction peak corresponding to the spinel phase $Co_3O_4$ begin to occur with the increase of the content of residual Co, suggesting that the residual Co is presented in the form of the spinel phase $Co_3O_4$.

What is claimed is:

1. A lithium cobalt metal oxide powder having a coating structure, wherein the lithium cobalt metal oxide powder comprises a lithium cobalt metal oxide matrix and a $Co_3O_4$ coating layer, a general formula of the lithium cobalt metal oxide powder is $Li_aCo_{1-x-y}M_xN_yO_2 \cdot rCo_3O_4$, wherein $0.002 < r \leq 0.05$, $1 \leq a \leq 1.1$, $0 < x \leq 0.02$, $0 \leq y \leq 0.005$, and $a < 1 + 3r$, M is a doping element, and N is a coating element.

2. The lithium cobalt metal oxide powder of claim 1, wherein a molar ratio $\theta_1$ of Li to Co+M+N satisfies: $0.92 \leq \theta_1 < 1$.

3. The lithium cobalt metal oxide powder of claim 1 wherein $Co_3O_4$ is presented both in an interior and on an outer surface of the lithium cobalt metal oxide matrix, and a mass ratio of the $Co_3O_4$ in the interior of the lithium cobalt metal oxide matrix to the $Co_3O_4$ on the outer surface of the lithium cobalt metal oxide matrix is smaller than 1.

4. The lithium cobalt metal oxide powder of claim 1 wherein M is selected from the group consisting of Mg, Ca, Cu, Al, B, Ti, Y, Zr, any combination thereof; and N is selected from the group consisting of Na, K, Mg, Ca, Cu, Al, B, Ti, Y, Zr, Ni, Mn, and any combination thereof.

5. The lithium cobalt metal oxide powder of claim 4, wherein M is selected from the group consisting of Mg, Al, and any combination thereof and N is selected from the group consisting of of Mg, Ti, and any combination thereof.

6. The lithium cobalt metal oxide powder of claim 1 wherein the $Co_3O_4$ is in a form of spinel phase $Co_3O_4$, and an amount of residual Li on the outer surface of the lithium cobalt metal oxide matrix is smaller than or equal to 0.05%.

7. A method for making the lithium cobalt metal oxide powder of claim 1, comprising steps of:
   (1) mixing uniformly and then sintering a Li-containing precursor, a first Co-containing precursor, and a M-containing precursor to obtain a lithium-rich matrix; and
   (2) if the lithium cobalt metal oxide powder comprises the coating element N, mixing uniformly and then sintering the lithium-rich matrix obtained from the step (1), a second Co-containing precursor, and a N-containing precursor to obtain the lithium cobalt metal oxide powder;

if the lithium cobalt metal oxide powder comprises no coating element N, mixing uniformly and then sintering the lithium-rich matrix obtained from the step (1) and a second Co-containing precursor to obtain the lithium cobalt metal oxide powder.

8. The method of claim 7, wherein in the step (2), the second Co-containing precursor is selected from the group consisting of $Co(OH)_2$, $CoCO_3$, $Co_3O_4$, and any combination thereof.

9. The method of claim 7, wherein, in the step (1), a sintering temperature is 900° C. to 1100° C., a sintering time is 8 h to 12 h, and the sintering is performed in an air atmosphere; in the step (2), a sintering temperature is 600° C. to 1000° C., a sintering time is 6 h to 12 h, and the sintering is performed in an air atmosphere.

10. A method for determining a content of $Co_3O_4$ in the lithium cobalt metal oxide powder of claim 1, comprising steps of:
   (1) adding a soaking agent and a metal ion salt solution to the lithium cobalt metal oxide powder, stirring and dissolving fully to obtain a first solution;
   (2) filtering the first solution obtained from the step (1) by a filter membrane, and washing a residue on the filter membrane after the filtration is finished;
   (3) adding the filter membrane along with the residue of the step (2) into a strong acid solution, peeling off the residue totally from the filter membrane into the strong acid solution, thereby obtaining a second solution containing the residue and the strong acid solution;
   (4) adding a strong acid solution again into the second solution obtained from the step (3) to obtain a mixed solution, heating, evaporating, and drying the mixed solution;
   (5) cooling and then diluting to a final volume, thereby obtaining a solution to be measured;
   (6) measuring a content of Co in the solution obtained from the step (5) and then calculating a corresponding content of $Co_3O_4$ to obtain the content of the $Co_3O_4$ in the sample.

11. The method of claim 10, wherein the step (4) is repeated at least once before proceeding the step (5).

12. The method of claim 10, wherein the soaking agent is selected from the group consisting of HCl, $H_2SO_4$, $H_3PO_4$, and any combination thereof, and at least selected from the group consisting of $H_2SO_4$, $H_3PO_4$, and any combination thereof.

13. The method of claim 10, wherein the metal ion salt solution is selected from the group consisting of $NiSO_4$, $NiCl_2$, $MnSO_4$, $MnCl_2$, $FeSO_4$, $FeCl_2$, $Cu_2SO_4$, $CuCl_2$, $CrSO_4$, and $CrCl_2$, and any combination thereof.

14. The method of claim 10, wherein the strong acid is selected from the group consisting of nitric acid, hydrochloric acid, aqua regia, and any combination thereof, and mass concentrations of the nitric acid, the hydrochloric acid, and the aqua regia are 30% to 70%.

15. The method of claim 10, wherein a stirring time is 0.5 h to 2 h.

16. The method of claim 15, wherein the stirring time is 0.8 h to 1.4 h.

17. The lithium cobalt metal oxide powder of claim 1, wherein $0<y\leq0.005$.

18. The lithium cobalt metal oxide powder of claim 1, wherein the lithium cobalt metal oxide powder further comprising a hexagonal phase lithium cobalt metal oxide on the outer surface of the lithium cobalt metal oxide matrix.

* * * * *

UNITED STATES PATENT AND TRADEMARK OFFICE
CERTIFICATE OF CORRECTION

| | |
|---|---|
| PATENT NO. | : 11,784,309 B2 |
| APPLICATION NO. | : 16/756889 |
| DATED | : October 10, 2023 |
| INVENTOR(S) | : Yongchang Li et al. |

It is certified that error appears in the above-identified patent and that said Letters Patent is hereby corrected as shown below:

In the Claims

Claim 5, Column 10, Line 52, "group consisting of of Mg, Ti, and any combination thereof." should be – group consisting of Mg, Ti, and any combination thereof. –

Claim 13, Column 12, Line 17, "$CrSO_4$, and $CrCl_2$, and any combination thereof." should be – $CrSO_4$, $CrCl_2$, and any combination thereof. –

Signed and Sealed this
Twenty-sixth Day of March, 2024

Katherine Kelly Vidal
*Director of the United States Patent and Trademark Office*